Patented Nov. 26, 1929

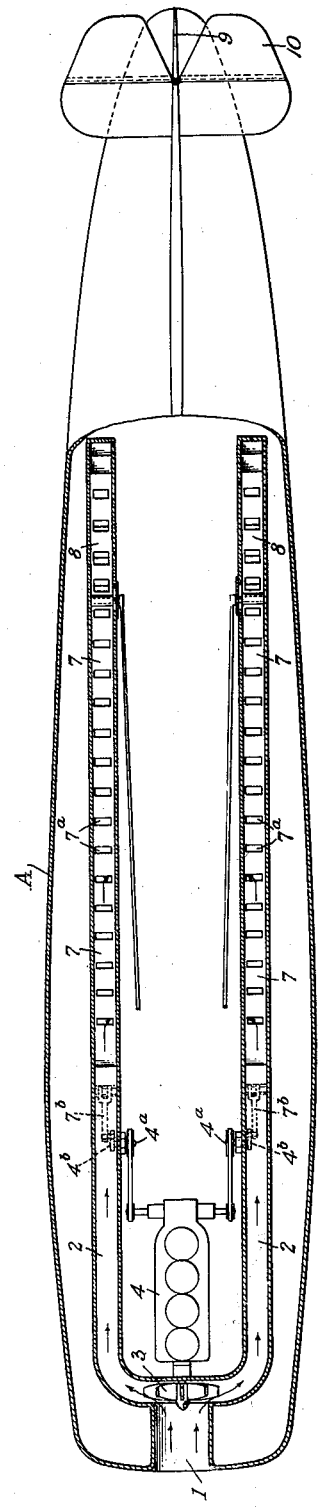
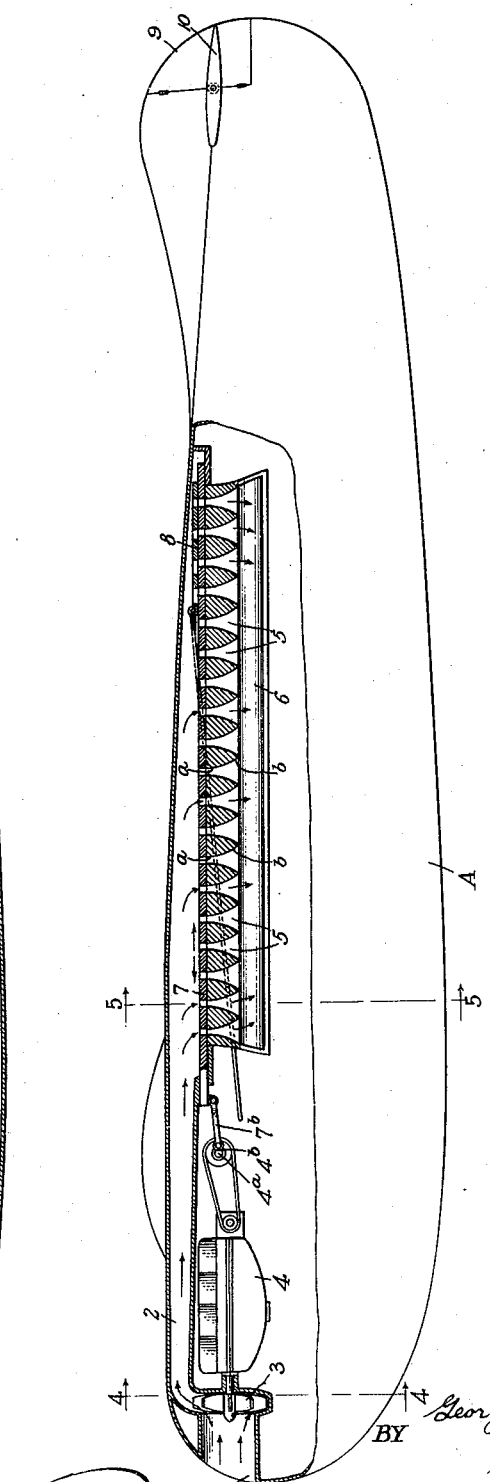

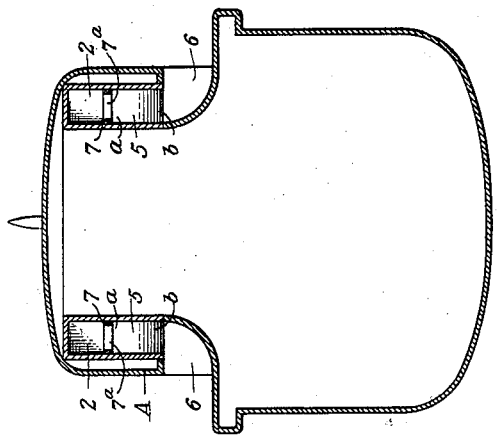
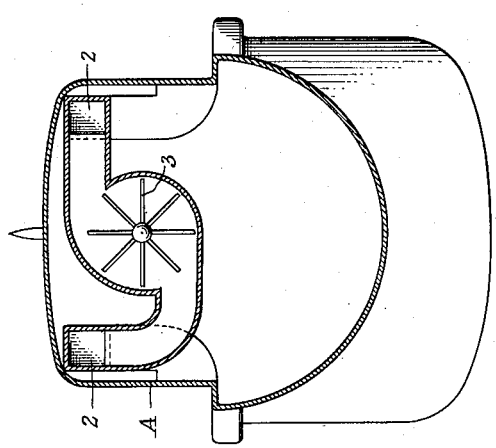
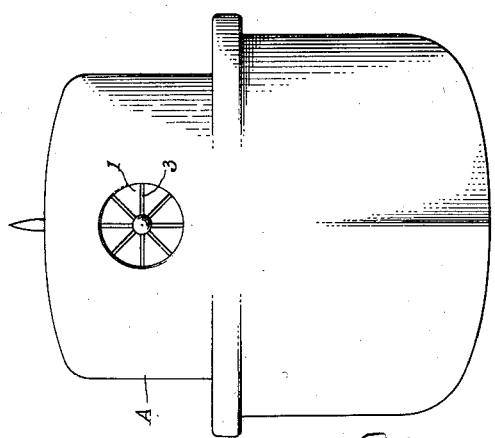

1,737,035

UNITED STATES PATENT OFFICE

GEORGE P. WAGNER, OF NEW YORK, N. Y., ASSIGNOR, BY MESNE ASSIGNMENTS, TO AIR LINE TRANSPORTATION COMPANY, OF PHILADELPHIA, PENNSYLVANIA, A CORPORATION OF DELAWARE

LIFT MECHANISM FOR AIRCRAFT

Application filed August 28, 1928. Serial No. 302,576.

This invention pertains to a lift mechanism for aircraft and is particularly designed for use in heavier-than-air craft. The principal object of the invention is to provide pneumatic means which will enable a heavier-than-air craft to lift itself vertically, in starting or in flight; will also enable the craft to sustain itself in flight; and also to "hover" over a landing place or other object; and also arrest or cushion its "dropping" in landing. Such lift mechanism will permit free sustentation and flight manueuvers of the aircraft as explained hereinafter.

The invention contemplates the use of means, such as an air impeller or impellers, capable of producing currents of air of high velocity; air ducts for guiding the air currents, and a plurality of expansion air nozzles adapted to effect a static reaction from the dynamic change of the air in its passage through the nozzles whereby the craft is lifted. Other minor objects of the invention will be hereinafter set forth.

I will explain the invention with reference to the accompanying drawings which illustrate one practical embodiment thereof to enable others familiar with the art to adopt and use the same; and summarize in the claims the essentials of the invention and the novel features of construction and novel combinations of parts for all of which protection is desired.

In said drawings:—

Figure 1 is a top plan view of an aircraft provided with my novel lift mechanism.

Fig. 2 is a side elevation thereof.

Fig. 3 is a front elevation thereof.

Fig. 4 is a section on the line 4—4 Fig. 1.

Fig. 5 is a section on the line 5—5 Fig. 1.

The air craft body may be of any suitable type. The body A is provided at its front end with an air inlet 1 which at its rear end communicates with longitudinally disposed air ducts 2 which are preferably arranged at opposite sides of and parallel with the longitudinal axis of the body. At the inner end of the chamber 1 is an air impeller 3 preferably of the centrifugal type and which may be operated by a motor 4 of any suitable kind adapted to drive the impeller at high speed. When this impeller is rotated air is drawn in through the opening 1 and then discharged peripherally from the impeller at high speed into the ducts 2. Beneath the ducts 2 are a series of expanding air nozzles 5 which are preferably vertically disposed being smaller at their upper end and enlarging at their lower end as indicated, the space between the upper ends $a$ of the nozzles 5 and the lower ends $b$ of these nozzles being the space in which the air velocity is lowered by expansion to obtain lift reaction and below these nozzles is an outwardly opening chute 6 through which the expanded air exhausted from the nozzles escapes.

The air impeller 3 which produces the dynamic air condition may be of any desired type capable of giving the desired result, and a centrifugal impeller is merely for demonstrating a constituent of one of many combinations capable of producing the object of this invention.

It is desirable, for reasons hereinafter explained, that the flow of air through the nozzles should be interrupted or intermittent, as this materially lessens the amount of power required to produce lift, and it is desirable to interrupt the flow of air at the inlets $a$ of the nozzles 5. For this purpose any suitable mechanical means may be used, but for simplicity of explanation and operation I have shown in the drawings a slide valve 7, which is arranged in each of the ducts 2, and such valves 7 overlie the inner ends $a$ of all the related nozzles. Each of these valves is provided with a series of apertures $7^a$ adapted in one position of the valve to register with the inner ends $a$ of the nozzles, while in another position of the valves the air supply is cut off. The valves 7 should be operated rapidly and they might be operated by any suitable means from the motor 4. As indicated in the drawings each shaft is connected by a link $7^b$ with a crank $4^b$ on a shaft $4^a$ driven by the motor.

It is to be understood that any suitable type of valve may be employed and slide valves are shown merely for simplicity of illustration of a means for intermitting the air flow through the nozzles.

Each of the expansion nozzles 5 in interior arrangement is of the conventional design for air expansion nozzles and each is preferably set vertical to the longitudinal trim position of the air craft so as to obtain the greatest lift possible from the dynamic change of air in its passage through the nozzles. The dynamic change of air is understood to be the change caused by the decrease of air velocity by expansion in its passage through the nozzles from $a$ to $b$.

An air craft equipped with the aforesaid arrangement of air nozzles and air impelling means (assuming that the impeller was properly adapted to supply sufficient volume of air, and that a sufficient number of nozzles was provided) would when the impeller was in operation lift vertically, due to the reaction of the air in passing through the nozzles, it being understood that the air nozzles should be so located and positioned that the craft would be properly balanced and maintained on its longitudinal and transverse keel when the air is exhausted through the opposite sets of nozzles.

If the air were to flow continuously through the nozzles a great expenditure of power would be required to operate the apparatus. To economize power and enhance the lifting effect, I cause the air to pass intermittently, but with great rapidity, through the nozzles; and this can be accomplished by so operating the valves that the air which is supplied from the chambers 2 is intermittently admitted through the nozzles 5 to produce rapid pulsating reactions upon the walls of the nozzles, such intermittent reactions being of infinitesimal duration, but the necessary lifting effect of the reactions upon the body of the vehicle is obtainable with less power than if a steady flow of air through the nozzles was employed.

To facilitate an understanding of the operation; and what I term intermittent or pulsating nozzle actions; let it be assumed that the impeller 3 is capable of delivering an amount of air such as will be required in the useful operation of the nozzles; also that there are a sufficient number of nozzles provided to enable the reactions thereon to lift the craft; and also assume that the valves 7 are operated so that the air flow to the nozzles is alternately stopped and started for small fractional parts of a second.

Under these conditions it follows that when air is cut off from the nozzles (by closing the valves) the air craft begins to lose altitude and to drop by gravity, and before the craft can regain its lost altitude (which however is infinitesimal because the opening and closing of the valve takes place in so small a part of a second) the rapidity of the descent has to be checked. This checking is, however, immediately effected upon the opening of the valves, whereupon the air admitted to the nozzles reacts thereupon and overcomes the effect of the weight of the aircraft body and gravity.

The impeller should be capable of supplying air in sufficient quantity and at sufficient velocity to overcome the total force of gravity and weight of the plane. Now as soon as the gravital action of the plane is checked (which is practically instantaneous upon opening of the valves) there is an overbalance of nozzle reaction and the plane is caused to rise and regain the altitude which it had lost, and if the air pressure is sufficient it will even go higher. The altitude attained or maintained is dependent upon the volume and velocity of air supplied to the nozzles.

Assuming that the air pressure is supplied at uniform pressure and quantity by the impeller, and that the valves are operated uniformly, and that the same number of nozzles are uniformly used; then the craft could attain and maintain a given altitude. By reducing the air volume or pressure the plane could be gently lowered.

In normal operation a complete air cycle (which means the opening and closing of the nozzles) includes the dropping of the plane for one-half the lapse period, an almost instantaneous check of altitude drop at the opening of the valve, then a gain of altitude due to greater reaction and continued after valve closing to a duration of the first half of valve close or lapse duration. The effect upon power consumption is tremendous.

Variation in altitude may be obtained by varying the impeller speed, varying the speed of the actuation of the valves; or by varying the number of nozzles employed. The means for producing such variations will form the subject matter of other applications and need not be described herein, as the present application is directed to the broad invention.

As indicated in Fig. 1 a supplemental valve 8 overlying part of each valve 7, and valve 8 can be shifted so as to render the valve effective or ineffective as regards the nozzles underlying the valve 8. Such valves 8 could be arranged as desired so that any of the nozzles might be cut out of operation at the will of the operator, or so as to control the operation of any desired nozzles. The valves 8 shown in the drawings are so disposed as to control the longitudinal trim of the craft.

The usual rudder 9 and pitch rudder control 10 may also be used to govern the craft.

*Example*

To determine the weight of air required to sustain an aircraft in the atmosphere with air flowing through the expansion reaction nozzles at the inlet rate of 1000 feet per second to 1/50th of the inlet at the exhaust. Also to determine the weight of air required with the valve for controlling air supply: the period of opening, for air flow through the nozzles being over 1/100th part of 1/32nd of a second, that is with the valve actuating so as to give 32 openings and closings of air per second, each opening slot is proportioned to remain open for air supply to the valve over 1/100 of a single cycle of opening and closing. Find the horsepower required for impelling air through the nozzles in each case. The first step for solving this problem is to arrive at the formula to be used. The reaction or impulse due to air flowing to different dynamic characteristics is equal to the product or air mass flowing per unit of time and the velocity function of the dynamic characteristics, or $$\text{Reaction} = \frac{W(V_I - V_F)}{g}$$

where $W$ = weight of air flowing per unit of time
$V_I$ = inflow velocity of air to nozzles
$V_F$ = exhaust flow
$g$ = force due to gravity.

Since the plane weighs 30,000 lbs. which is reaction required in nozzles to obtain lift, and 1000 feet per second is the inlet flow velocity with 50 expansions or 1000/50 = 20 feet per second the exhaust velocity, the formula resolves itself by interpolation for the unknown ($W$), which is unit weight of air flow per second to $$W = \frac{\text{Reaction} \times g}{V_I - V_F} = \frac{30000 \times 32}{1000 - 20} =$$

979 lbs. of air required per second.

The energy required to move this weight of air at a velocity of 1000 feet per second is determined by kinetic energy formula $$\frac{WV^2}{2g \times 550} = \frac{979 \times 1000 \times 1000}{2 \times 32 \times 550} =$$

27812 H. P.

Such amount of power would be expensive, therefore I employ the valve mechanism of, say the period cited in the problem given. With such a valve arrangement there are several other points which must be taken into consideration, and to make these clear I shall consider each change in sequence over the complete cycle. The cycle may be assumed as divided into two parts, the first as that in which air is allowed to flow through the nozzles and the other in which this flow is checked. Now this latter part of the cycle can also be considered as divided into two equal portions, the first as that of rising of the aircraft due to the reaction given to the nozzles by virtue of the flow of air through the nozzles; and the remaining portion as that of falling over an equal distance due to the force of gravity and lapse of air reaction upon the nozzles. From this it is obvious that the cycle should begin at the middle of valve closed period since the plane falling even through the infinitesimal part of a second, assumed in the problem given, adds considerably to the weight of aircraft in reaction for free sustentation.

In the example it was assumed that the period of a completed cycle required 1/32nd of a second, and that 1/100th of this taken for nozzle reaction with the remainder closed to reaction. To simplify the problem the lapse of time may be taken as 1/32nd of a second for determining added weight of reaction. As explained this period is divided in half, the first for spending reaction or impulse due to air flowing through the nozzles, the latter in falling to produce an added amount to the weight of the craft. To determine this increase in weight reference is made to the simple formula for velocity which is where $$V = gt$$
$V$ = velocity
$g$ = gravity
$t$ = time.

and which may be combined with formula $$\text{Reaction} = \frac{WV}{g}$$

where reaction in this case is increase of weight due to the body falling $W$ = weight of the body or aircraft
$V$ = velocity, so that Reaction = Wt. or
$30000 \times 1/32 \times 1/2 = 468$ lbs. app.

This weight plus that of the aircraft is weight to be overcome at each reaction of airflow through the nozzle or $$30000 + 468 = 30468 \text{ lbs.}$$

Solving for airflow as in case for steady air flow through the nozzles $$W = \frac{30468 \times 32}{1000 - 20} = 995 \text{ lbs.}$$

as the rate of air weight required per second.

Since the air flow through the nozzles is governed to 1/100th of the cycle period, over a range of one second the weight of air flow will be cut to 995/100 or 9.95 lbs. of air flow per second.

This brings the cycle to the closing off of the air flow. A reaction which results from the flow of air at a rate that equals the force produced by a body falling is all that is needed to check the fall of the body instantaneously. It can also be said that immediately after this fall of the aircraft is checked the craft will begin to rise and gain velocity of rise until the flow of air for nozzle reaction ceases. The movement of the mass of the aircraft develops potential energy that will carry the plane on upwardly until the energy is spent by the counteraction of gravity. The height of rise will be equal to the fall since the nozzle reaction is assumed to be constant. The last reaction completes the cycle and may be summed up as an initial falling of the aircraft; the checking of the fall by nozzle reaction due to air expansion, the rise of the craft due to constant reaction even after checking the fall; and the continuance of rise until the craft reaches its initial position because of energy stored in the moving body before the air flow through the nozzles is checked.

The power is determined as in the case for steady air flow. where $w = 9.95$ lbs. of air per second
$V^2 = 1000 \times 1000$
$2g = 64$ app. twice the force of gravity
$550 =$ ft. lbs. per second per H. P.

$$H. P. = \frac{9.95 \times 1000 \times 1000}{64 \times 550} = 282$$

This power of course is only theoretical, but at most is no more than double the figure. Knowing that the conventional plane carries no more than 20 lbs. per horsepower as compared to about 50 lbs. per horsepower, which may be taken as a safe figure, after power for impulsion forward has been deducted, it is obvious that this method of lift will prove far more efficient than the present conventional methods used.

The short period of time for obtaining reaction in the above problem, is considered as the maximum reaction period, and allowance is made for a period to build up to this maximum reaction, as the flow velocity is around 1000 feet per second; thus a very close approach can be made to the assumption and results obtained from the data assumed. The weight of air required and also horsepower required can be calculated by the formula cited above.

I claim:—

1. In combination, a body having air nozzles, means for forcing air to the nozzles and means for rapidly interrupting the admission of air to the nozzles; the reaction of the air currents upon the walls of the nozzles moving the vehicle.

2. In combination, a body, an impeller, nozzles into which the air is discharged by the impeller, and means for rapidly alternately permitting and stopping the admission of air to the nozzles; the nozzles being so arranged that the reaction of the air produced by the impeller upon the walls of the nozzles move the vehicle.

3. In combination, an aircraft body having an air inlet, air discharge nozzles, means between the inlet and nozzles to force air to the nozzles, and means for rapidly opening and closing inlet of air to the nozzles; the reaction of the air in the nozzles moving the body.

4. In combination an airplane body having sets of expanding air nozzles; means to discharge air to the nozzles, the reaction of the air currents upon the walls of the nozzles impelling the body; and valve means for rapidly opening and closing the inlets of the air nozzles.

5. In combination, an aircraft body having an air chamber, air discharge nozzles communicating with said chamber; an impeller in the chamber adapted to force air to the nozzles, valves for opening and closing the nozzles, and means for rapidly operating the valves, the reaction of the air in the nozzles moving the body.

6. In combination, an aircraft body having an air chamber, downwardly directed air discharge nozzles, and ducts for conducting air from said chamber to said nozzles; with an impeller in the chamber adapted to force the air through the ducts to the nozzles, and means for rapidly interrupting the admission of air to the nozzles.

7. In combination with an aircraft body having an air chamber, sets of expanding air nozzles, ducts communicating with said chamber for directing the air to the sets of nozzles, an impeller in the chamber adapted to force air through said ducts to said nozzles, and valve means for rapidly opening and closing the inlets of the air nozzles; the reaction of the air current in the nozzles moving the body.

8. In combination a body having air nozzles, means for forcing air to the nozzles, means for rapidly interrupting the admission of air to the nozzles; the reaction of the air currents upon the walls of the nozzles moving the vehicle; and means for cutting in or out of operation some of the nozzles.

9. In combination an airplane body having sets of expanding air nozzles; and an impeller adapted to discharge air to the nozzles, valve means for rapidly opening and closing the inlets of the air nozzles, the reaction of the air currents upon the walls of the nozzles impelling the body; and means whereby some of the nozzles can be cut out of operation.

10. In combination an aircraft body having an air chamber, downwardly directed air discharge nozzles, and ducts for conducting air from said chamber to said nozzles; with an impeller in the chamber adapted to force the air through the ducts to the nozzles, means for interrupting the admission of air to the nozzles, and means for cutting in or out of operation some of the nozzles.

11. In combination with an aircraft body having an air chamber, sets of expanding air nozzles communicating with said chamber; an impeller in the chamber adapted to force air to said nozzles, ducts for directing the air to the sets of nozzles, and valves for opening and closing the inlets of the air nozzles the reaction of the air current in the nozzles moving the body; means for rapidly operating said valves, and means for cutting in and out of operation some of the air nozzles.

GEORGE P. WAGNER.